(12) United States Patent
Li et al.

(10) Patent No.: US 10,885,300 B2
(45) Date of Patent: Jan. 5, 2021

(54) METHOD AND SYSTEM FOR CONTACTLESS 3D FINGERPRINT IMAGE ACQUISITION

(71) Applicant: ZKTECO CO. LTD, Guangdong (CN)

(72) Inventors: Zhinong Li, Beijing (CN); Chongliang Zhong, Shenzhen (CN); Limu Yang, Shenzhen (CN)

(73) Assignee: ZKTECO CO., LTD., Guangdong (CN)

( * ) Notice: Subject to any disclaimer, the term of this patent is extended or adjusted under 35 U.S.C. 154(b) by 38 days.

(21) Appl. No.: 16/098,299

(22) PCT Filed: Sep. 28, 2016

(86) PCT No.: PCT/CN2016/100556
§ 371 (c)(1),
(2) Date: Nov. 1, 2018

(87) PCT Pub. No.: WO2018/000638
PCT Pub. Date: Jan. 4, 2018

(65) Prior Publication Data
US 2019/0213378 A1  Jul. 11, 2019

(30) Foreign Application Priority Data

Jun. 29, 2016 (CN) .......................... 2016 1 0509094

(51) Int. Cl.
| | | |
|---|---|---|
| *G06K 9/00* | (2006.01) | |
| *G06K 9/03* | (2006.01) | |
| *G06F 3/16* | (2006.01) | |

(52) U.S. Cl.
CPC .......... *G06K 9/0004* (2013.01); *G06F 3/167* (2013.01); *G06K 9/00026* (2013.01);
(Continued)

(58) Field of Classification Search
CPC .............. G06K 9/036; G06K 9/00033; G06K 9/00026; A61B 5/1172
(Continued)

(56) References Cited

U.S. PATENT DOCUMENTS 5,077,803 A * 12/1991 Kato .................... A61B 5/1172
382/124
2012/0076369 A1 * 3/2012 Abramovich ...... G06K 9/00033
382/124
(Continued)

FOREIGN PATENT DOCUMENTS

| CN | 101067845 A | 11/2007 |
|---|---|---|
| CN | 101504724 A | 8/2009 |

(Continued)

OTHER PUBLICATIONS

International Search Report and Written Opinion dated Apr. 10, 2017 in International Application PCT/CN2016/100556.

*Primary Examiner* — Abdul-Samad A Adediran
(74) *Attorney, Agent, or Firm* — Pillsbury Winthrop Shaw Pittman LLP

(57) ABSTRACT

Embodiments of the present invention disclose a non-contact 3D fingerprint capturing apparatus and method. The apparatus includes: a housing, a circuit board and a fingerprint reader that are disposed in the housing; the circuit board includes a first control module; the fingerprint reader includes a fingerprint capturing module and a positioning module; the positioning module casts light to a first position point on a finger object; the fingerprint capturing module receives light reflected from the first position point, converts an optical signal into an electrical signal, and sends the electrical signal to the first control module; the first control module judges, according to the electrical signal, whether the first position point is a standard point, the standard point being an aperture with a diameter less than a first threshold (Continued)

and an illumination intensity greater than a second threshold; if the first position point is a standard point, the fingerprint capturing module captures fingerprint images from multiple directions, and transmits the fingerprint images to the first control module; and the first control module creates a 3D fingerprint image according to the fingerprint images. The embodiments of the present invention further provide a non-contact 3D fingerprint capturing method.

9 Claims, 7 Drawing Sheets

(52) U.S. Cl.
CPC ..... G06K 9/00033 (2013.01); G06K 9/00201 (2013.01); G06K 9/036 (2013.01); *G06K 2209/401* (2013.01)

(58) Field of Classification Search
USPC .................................................. 382/124, 125
See application file for complete search history.

(56) References Cited

U.S. PATENT DOCUMENTS

2015/0178545 A1* 6/2015 Thorsted ............ G06K 9/00026
  382/124
2015/0220771 A1* 8/2015 Thiebot .................. G06K 9/036
  382/125

FOREIGN PATENT DOCUMENTS

| CN | 103455810 A | 12/2013 |
| CN | 103699885 A | 4/2014 |
| CN | 204759456 U | 11/2015 |
| EP | 0459712 A2 | 12/1991 |
| EP | 2312493 A1 | 4/2011 |

* cited by examiner

METHOD AND SYSTEM FOR CONTACTLESS 3D FINGERPRINT IMAGE ACQUISITION

CROSS REFERENCE TO RELATED APPLICATION

The present application is a national stage application, filed under 35 U.S.C. § 371, of International Application No. PCT/CN2016/100556, filed on Sep. 28, 2016, which claims priority to Chinese Patent Application No. 201610509094.4 filed with the Chinese Patent Office on Jun. 29, 2016 and entitled "NON-CONTACT 3D FINGERPRINT CAPTURING APPARATUS AND METHOD", all of which are incorporated herein by reference in their entireties.

TECHNICAL FIELD

The present invention relates to applications of a stereo imaging technology, a machine vision technology and an optical technology in the field of fingerprint identification, and in particular, to a non-contact 3D fingerprint capturing apparatus and method.

BACKGROUND ART

Fingerprints have been widely applied in the biometric identification technology due to their immutability, uniqueness and convenience. Fingerprint identification is widely applied in products such as access control and attendance systems and is used for identification. In a general method, the fingerprint identification technology mainly compares a fingerprint characteristic captured on site by an image collector with a fingerprint characteristic stored in a fingerprint library to judge whether the captured fingerprint characteristic matches with the fingerprint characteristic stored in the fingerprint library, thus obtaining a processing result. In a conventional method, during fingerprint reading, a user needs to touch a fingerprint reader with a finger. The finger is pressed on the fingerprint reader, such that the fingerprint reader acquires a two-dimensional fingerprint characteristic for analysis. Then, a processing result indicating matching or mismatching is obtained. In the conventional method, if a fingerprint imprint is duplicated on a smooth object, it is highly possible to pass fingerprint authentication of a fingerprint identification apparatus by using the counterfeit fingerprint. Therefore, counterfeiting can be easily conducted when the conventional fingerprint identification technology is adopted, and anti-counterfeiting is relatively difficult.

SUMMARY OF THE INVENTION

Embodiments of the present invention provide a non-contact 3D fingerprint capturing apparatus and method, which achieve a good anti-counterfeiting effect and improve the security of identification.

According to a first aspect of the present invention, a non-contact 3D fingerprint capturing apparatus is provided. The apparatus includes: a housing, a fingerprint reader being disposed in the housing, wherein the fingerprint reader includes a fingerprint capturing module, a positioning module and a first control module, the first control module being disposed on a circuit board;

the positioning module casts light to a first position point on a finger object;

the fingerprint capturing module receives light reflected from the first position point, converts an optical signal into an electrical signal, and sends the electrical signal to the first control module;

the first control module judges, according to the electrical signal, whether the first position point is a standard point, the standard point being an aperture with a diameter less than a first threshold and an illumination intensity greater than a second threshold;

if the first position point is a standard point, the fingerprint capturing module captures fingerprint images from multiple directions, and transmits the fingerprint images to the first control module; and the first control module creates a 3D fingerprint image according to the fingerprint images.

Optionally, the circuit board includes a second control module and a storage module;

the first control module transmits the 3D fingerprint image to the second control module; and the second control module performs matching processing according to the 3D fingerprint image and a fingerprint image stored by the storage module to obtain a processing result.

Optionally, a first light source is disposed on the circuit board; the fingerprint capturing module includes a reflector imaging assembly and an image capturing assembly; the reflector imaging assembly includes multiple planar reflectors in different directions, the image capturing assembly includes multiple lenses, and a sensor is disposed on an image receiving surface in each of the lens; and light emitted by the first light source is cast onto the finger object, light reflected from the finger object enters the lenses and is cast onto the sensors, the sensors convert the optical signal into an electrical signal, and a preset angle is formed between each sensor and the lens.

Optionally, the fingerprint capturing module further includes a second light source, the second light source includes at least two LED lamps, the LED lamp is disposed between every two lenses, and the second light source serves as a supplementary light source for the lenses.

Optionally, the positioning module includes an emission circuit and a reflector;

light emitted by the emission circuit is cast onto the reflector, and the reflector casts the light to the first position point on the finger object.

Optionally, the circuit board further includes an encryption module, a crystal oscillator circuit and a data communication module; the encryption module, the crystal oscillator circuit and the data communication module are all connected to the second control module;

the crystal oscillator circuit is configured to provide a clock signal for the second control module;

the encryption module is configured to encrypt data; and the data communication module is configured to receive or send data transmitted by an external device.

Optionally, the housing is provided with a universal serial bus (USB) interface, and the circuit board includes a step-down integrated circuit;

the USB interface is configured to be connected to an external power source; and the step-down integrated circuit is configured to supply power to the apparatus after reducing a voltage of the external power source.

Optionally, the apparatus further includes a glass layer, the glass layer is disposed above the fingerprint reader and is configured to package the fingerprint reader in the housing, a filter layer is coated on an inner surface of the glass layer, and the filter layer is used for filtering light of a preset band.

Optionally, the apparatus further includes a lens hood, and the lens hood is flexibly connected to the housing.

According to a second aspect of the present invention, a non-contact 3D fingerprint capturing method is provided. The method is applied to the apparatus provided in the foregoing first aspect, and the method includes:

emitting light and casting the light to a first position point on a finger object;

judging whether the first position point is a standard point, the standard point being an aperture with a diameter less than a first threshold and an illumination intensity greater than a second threshold;

if the first position point is a standard point, capturing fingerprint images from multiple directions;

creating a 3D fingerprint image according to the fingerprint images from the multiple directions; and performing matching processing according to the 3D fingerprint image and a stored fingerprint image to obtain a processing result.

Optionally, the method further includes:

if the first position point is not a standard point, providing a voice prompt to prompt a user to adjust a finger position.

It can be seen from the foregoing technical solution that the embodiments of the present invention have the following advantages:

In the embodiments of the present invention, in order to achieve fingerprint accuracy in different directions, the position of a finger of a user is determined. After it is determined that the finger of the user is placed at a standard capturing position, fingerprint images of the finger are captured at different angles from at least multiple directions. A 3D image is created according to the captured fingerprint images, thus significantly improving the accuracy of the created 3D image, reducing the possibility of fingerprint counterfeiting, achieving a good anti-counterfeiting effect, and improving the security of identification.

DETAILED DESCRIPTION

Embodiments of the present invention provide a non-contact 3D fingerprint capturing apparatus and method to prevent fingerprint counterfeiting, hence improving the security of identification. To make those skilled in the art better understand the solution of the present invention, technical solutions in the embodiments of the present invention will be described clearly and completely below with reference to the accompanying drawings in the embodiments of the present invention. Apparently, the described embodiments are merely some embodiments rather than all embodiments of the present invention. Based on the embodiments in the present invention, all other embodiments derived by those skilled in the art without creative efforts should belong to the protection scope of the present invention.

The terms such as "first", "second", "third" and "fourth" (if any) in the specification, the claims, and the accompanying drawings of the present invention are merely used to distinguish similar objects, and are not necessarily used to describe a specific sequence or order. It should be understood that the data used in this manner can be interchanged in a proper case, so that the embodiments of the present invention described here can be implemented in sequences different from the content shown or described here. Moreover, the terms "include" and "have" as well as any of their variations are intended to cover a non-exclusive inclusion. For example, a process, method, system, product or device including a series of steps or units not only includes the steps or units clearly listed, but also can include other steps or units not clearly listed or other steps or units inherent to the process, method, product or device.

In the embodiments of the present invention, in order to achieve fingerprint accuracy, the position of a finger of a user is determined. After it is determined that the finger of the user is placed at a standard capturing position, fingerprint images of the finger are captured from multiple directions. A 3D image is created according to the captured fingerprint images, and the created 3D image is matched with a pre-stored image to obtain a processing result.

Figure 1:
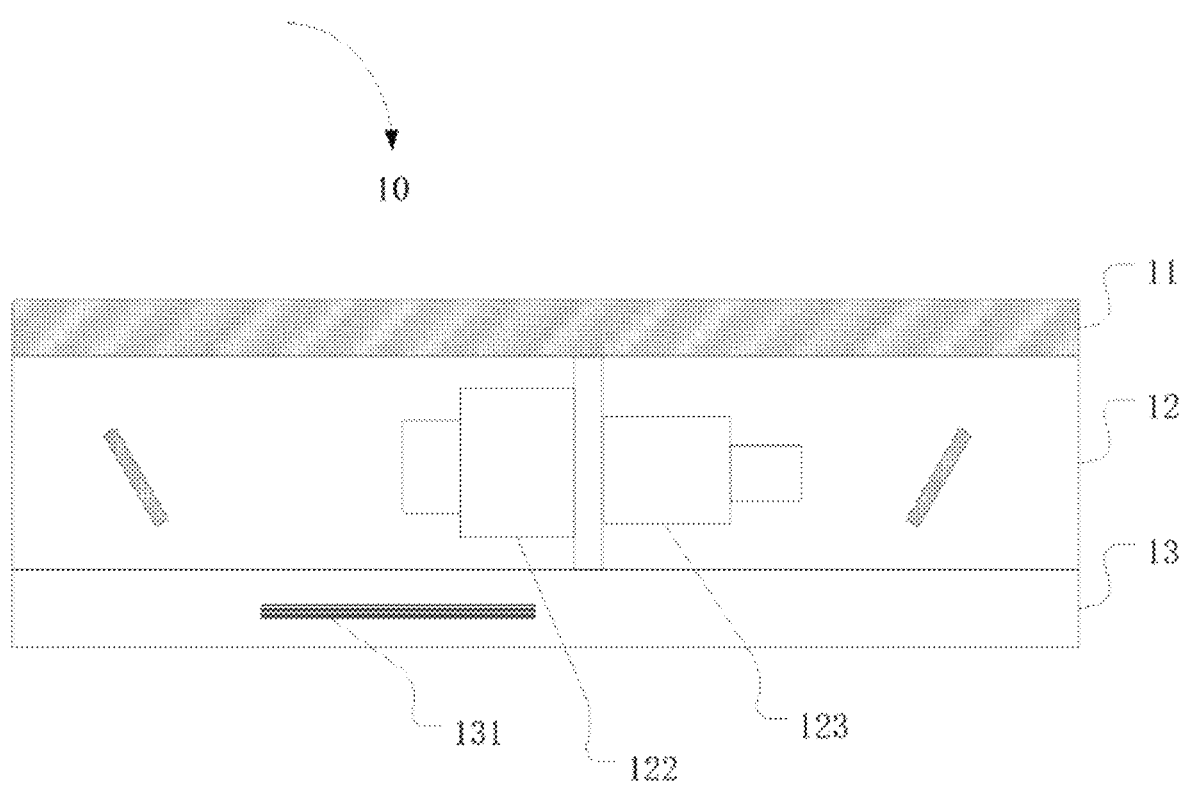
FIG. 1 is a schematic structural side view of a non-contact 3D fingerprint capturing apparatus according to an embodiment of the present invention.

The present invention provides a non-contact 3D fingerprint capturing apparatus. An embodiment of the apparatus includes the following components:

To facilitate comprehension, the structure of the apparatus is described first:

With reference to FIG. 1, FIG. 1 is a side view 10 of the apparatus. The apparatus includes a housing, a fingerprint reader 12 and a glass layer 11. A circuit board 13 is disposed in the housing. The circuit board 13 may be a PCD board or a PCB board. The glass layer 11 packages the fingerprint reader 12 and the circuit board in the housing. A first control module 124, a second control module 132, a storage module 138, a reflector imaging assembly base (not shown in the figure) and a first light source 131 are disposed on the circuit board. The first light source 131 may be at least two groups of LED surface-mounted lamps. For example, the first light source 131 may be a surface-mounted blue LED with a wavelength of 450 nm, which is configured to supplement light for the fingerprint reader 12.

The storage module 138 is connected to the second control module 132, and the storage module 138 is configured to store user fingerprint data.

Figure 2:
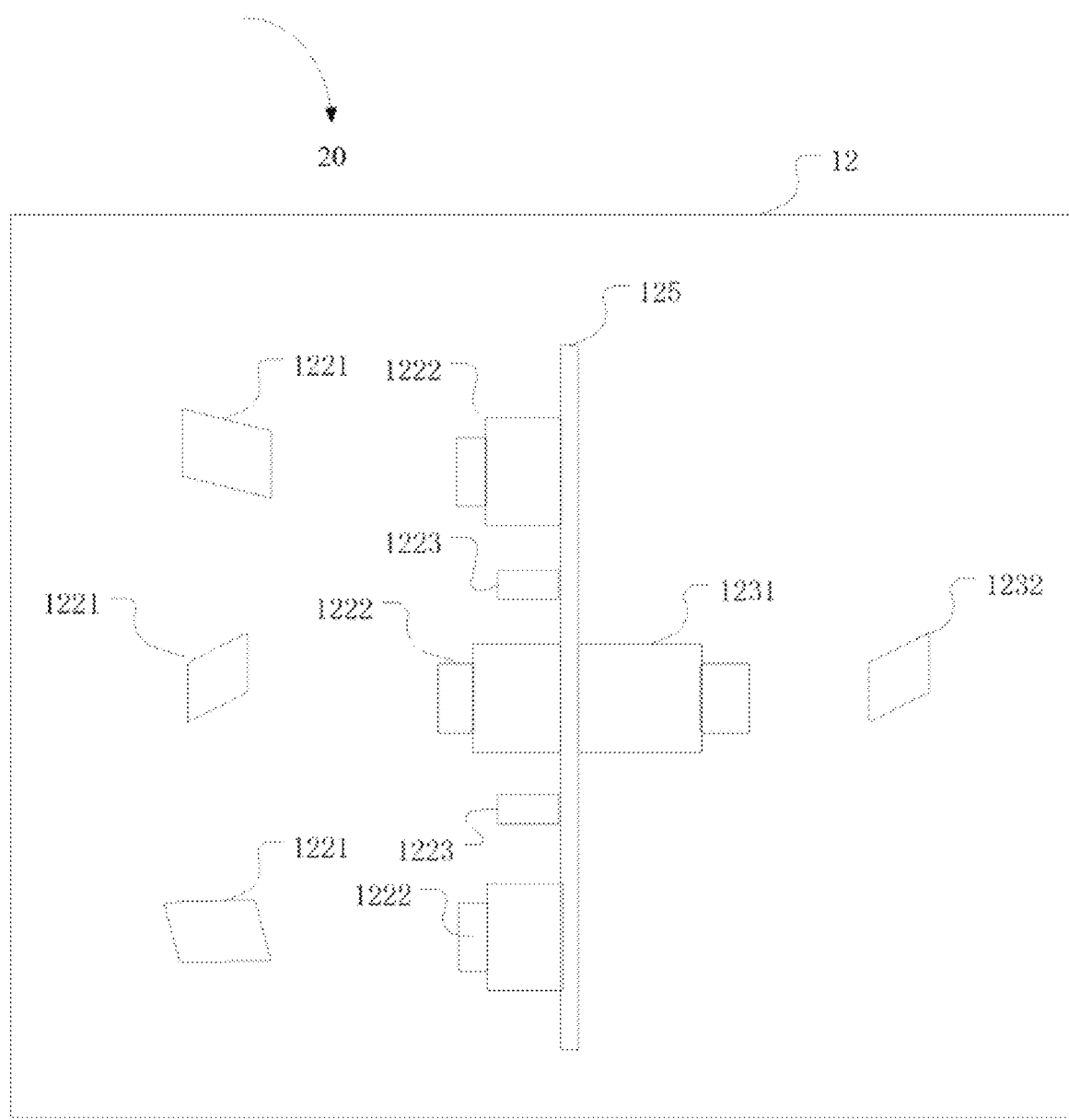
FIG. 2 is a schematic structural top view of a fingerprint reader according to an embodiment of the present invention.

With reference to FIG. 2, FIG. 2 is a schematic structural top view 20 of the apparatus. The fingerprint reader 12 includes a fingerprint capturing module 122, a positioning module 123 and a first control module 124. The fingerprint reader 12 is connected to the first control module 124. The fingerprint capturing module 122 includes a reflector imaging assembly, an image capturing assembly and a second light source 1223. The second light source 1223 may be at least two 3 mm plug-in blue LEDs with a wavelength of 450 nm. The second light source 1223 is configured to supplement light when the fingerprint reader 12 captures a fingerprint. It should be noted that, an emission light source of the positioning module 123 may be laser and may also be another light source in an actual application. Preferably, the positioning module may be a laser positioning module. In the embodiment of the present invention, the positioning module being a laser positioning module is used as an example for description. The positioning module includes an emission circuit. In the embodiment of the present invention, the emission circuit being a laser emission circuit is used as an example for description.

The reflector imaging assembly is disposed on the reflector imaging assembly base. The reflector imaging assembly includes multiple planar reflectors 1221 configured to capture fingerprint images from multiple directions. The planar reflectors 1221 are disposed along optical paths and form different angles with a horizontal plane respectively. In this embodiment, the number of the planar reflectors 1221 being 3 is used as an example for description. The image capturing assembly includes lenses 1222 and complementary metal-semiconductor (CMOS) sensors, and the CMOS sensors may be 2-megapixel sensors.

The CMOS sensor is disposed on an image receiving surface in the lens 1222. The number of the lenses 1222 is at least 3, and the number of the CMOS sensors is the same as the number of the lenses 1222. In the embodiment of the present invention, the number of the lenses 1222 being 3 is used as an example for description. A preset angle is formed between the CMOS sensor and the lens 1222. The three lenses 1222 are fixed on one side of a fixing plate 125 vertically, and the fixing plate 125 is disposed on the circuit board vertically. Among the three lenses 1222, an LED lamp is disposed between every two lenses. A preset angle is formed between the LED lamp and the fixing plate 125, so as to expand a light emitting range of the second light source. At least one planar reflector 1221 is disposed in front of each lens 1222, and a preset angle is formed between each planar reflector 1221 and the lens 1222, so that light from different directions enters the lens 1222. Each planar reflector 1221 reflects light towards a different direction. It can be ensured that fingerprints from at least three directions (with a direction of a nail as an upward direction, the three directions refer to: a lower side of the finger, a left side of the finger, and a right side of the finger) of the finger are reflected to the lenses 1222. It should be noted that, the number of the lenses 1222 and the number of the planar reflectors 1221 above are merely examples for description rather than limitations.

The laser positioning module 123 includes a laser emission circuit 1231 and a reflector 1232. The laser positioning module 123 is disposed on the other side of the fixing plate 125.

The laser emission circuit 1231, the CMOS sensor and the second light source 1223 are all connected to the first control module 124. The first control module 124 is connected to the second control module 132.

Figure 4:
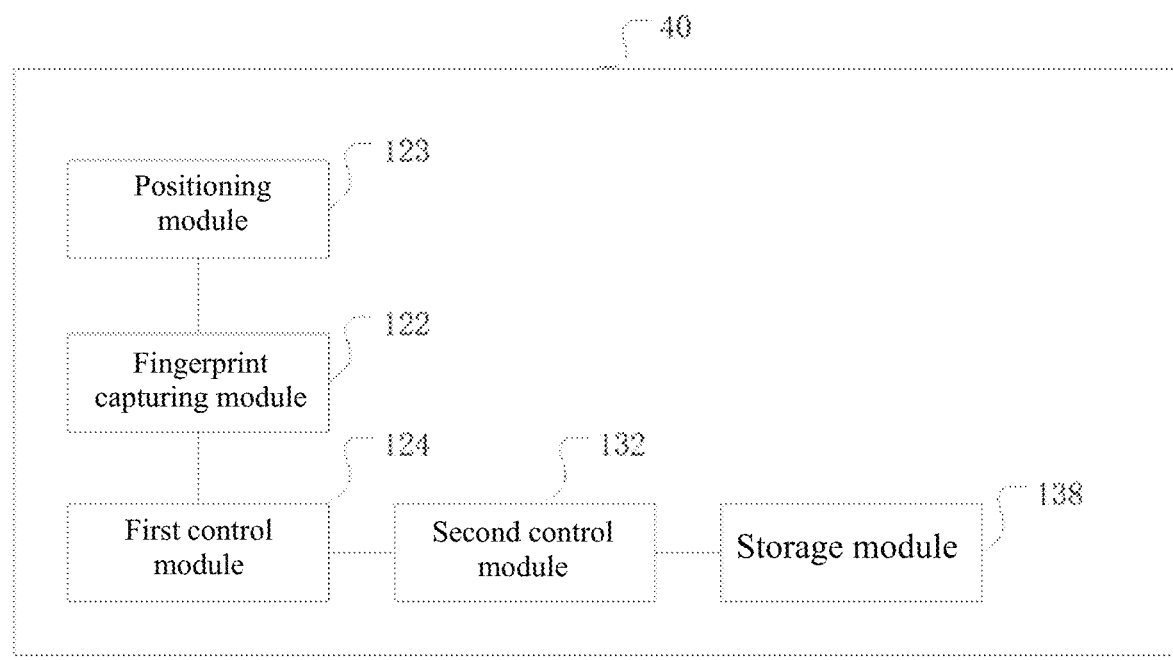
FIG. 4 is a schematic structural block diagram of an embodiment of a non-contact 3D fingerprint capturing apparatus according to an embodiment of the present invention.

The structure of the apparatus is described above. A fingerprint capturing process of the apparatus is described in detail below:

Referring to FIG. 4, in order to achieve fingerprint accuracy, it needs to be determined first whether a user finger 80 is placed at a standard capturing position. In the embodiment of the present invention, the laser positioning module 123 determines the position of the finger 80. Laser emitted by the laser emission circuit 1231 is reflected by the reflector 1232 to a finger 80 object of a user. A preset angle is formed between the laser emission circuit 1231 and the reflector 1232. The light is cast to a first position point on the finger 80 object. Light reflected from the first position point enters the lens 1222 and passes through the CMOS sensor. The CMOS sensor converts an optical signal into an electrical signal and sends the electrical signal to the first control module 124.

Figure 3:
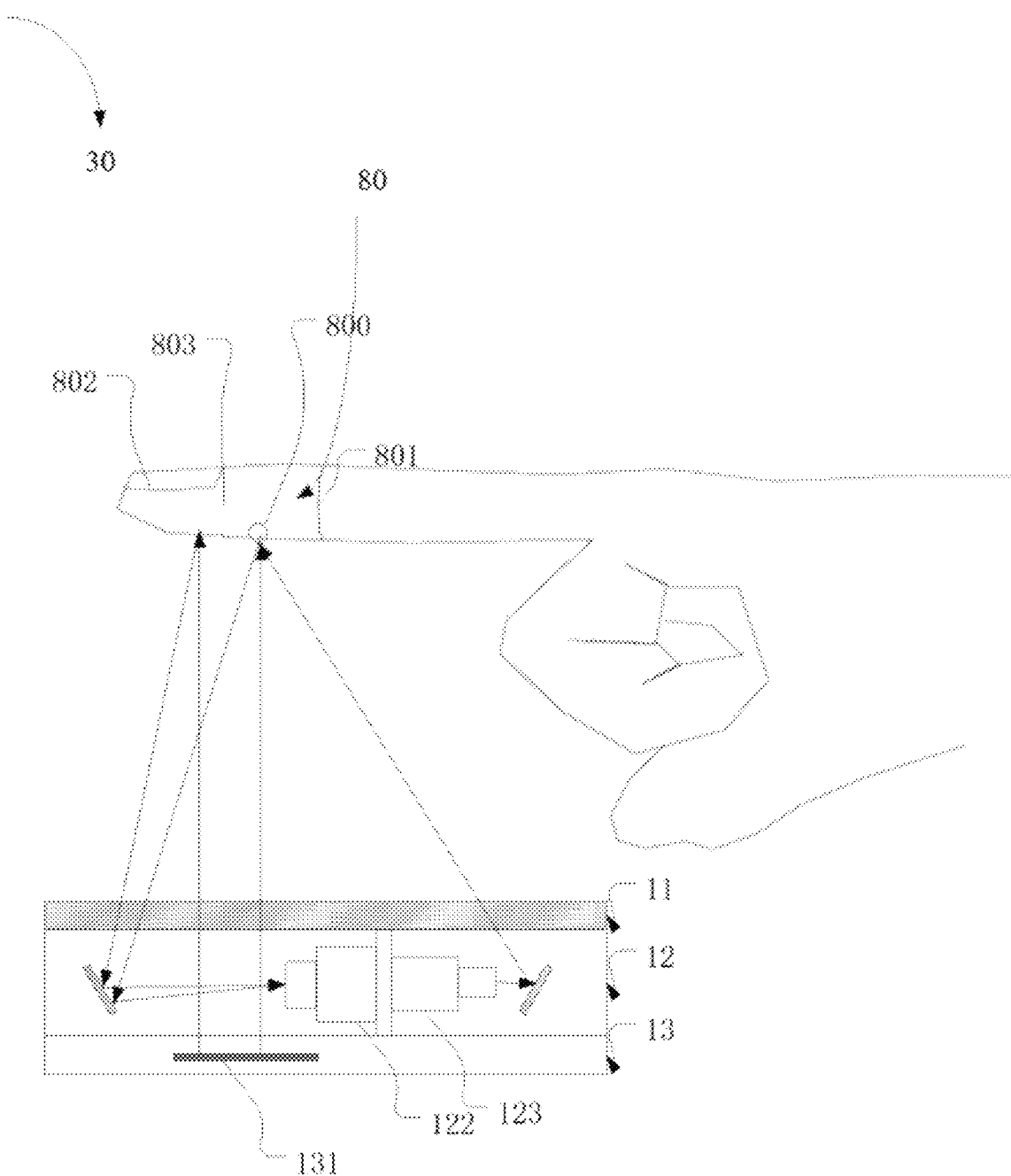
FIG. 3 is a schematic diagram of operations of a non-contact 3D fingerprint capturing apparatus according to an embodiment of the present invention.

The first control module 124 judges, according to the electrical signal, whether the first position point is a standard point 800. The standard point 800 is an aperture with a diameter less than a first threshold and an illumination intensity greater than a second threshold. For example, the first threshold is 2 mm. Preferably, the standard point 800 can further be embodied based on a specific position on the finger 80. For example, with reference to FIG. 3, the user finger 80 includes a finger tip 802 and a finger middle portion 803 above a first joint 801. There exists a central point between the finger tip 802 and the first joint 801. A distance from the central point to the finger tip 802 is equal to a distance from the central point to the first joint 801. The standard point 800 may also be judged based on whether the first position point is the central point. Therefore, whether the first position point is a standard point 800 can be judged based on at least two of the following factors: the diameter of the aperture, the illumination intensity of the aperture, and whether the aperture is the central point. In the embodiment of the present invention, it is judged whether the position of the user finger 80 is the standard capturing position based on the diameter of the aperture, the illumination intensity of the aperture and the central point, thus significantly improving the accuracy of the judgment.

Figure 5:
FIG. 5 is an optical schematic diagram of fingerprint imaging of a non-contact 3D fingerprint capturing apparatus according to an embodiment of the present invention.

If the first position point is a standard point 800, the fingerprint capturing module 122 captures fingerprint images from at least three directions. Specifically, with reference to FIG. 5, FIG. 5 is an optical schematic diagram of fingerprint imaging. For example, light emitted by the first light source 131 and/or the second light source 1223 is cast onto the finger 80 of the user. Light reflected from the finger 80 enters the lens 1222 through the planar reflector 1221 corresponding to the lens 1222 and passes through the CMOS sensor on the image receiving surface in the lens 1222. Each CMOS sensor in a different direction converts an acquired optical signal into an electrical signal. The CMOS sensor sends the electrical signal to the first control module 124. The first control module 124 creates a 3D fingerprint image according to the received electrical signals. It should be noted that, the planar reflector 1221 can be used for extending the optical path. For example, an extension range of the optical path may be 130 mm to 150 mm, so that the apparatus has a smaller size, is more flexible in use, and is applicable to a wider range.

The first control module 124 transmits the 3D fingerprint image to the second control module 132. The second control module 132 performs matching processing according to the 3D fingerprint image and a fingerprint image stored by the storage module 138 to obtain a processing result. The processing result includes matching and mismatching.

Optionally, if the first position point is not a standard point 800, the diameter of the aperture is greater than 2 mm, and the first position point is not the central point, the first control module 124 can control a connected audio module to send a voice prompt, so as to prompt the user that position of the finger 80 needs to be adjusted.

For example, if the finger is not placed at the standard capturing position, there possibly can be two situations: The first situation is that the finger is too close to the apparatus, the aperture becomes larger, the illumination intensity is reduced, and the aperture is deviated towards the first joint 801. The second situation is that the finger is too far away from the apparatus, the aperture becomes larger, the illumination intensity is reduced, and the aperture is deviated towards the finger tip 802.

Figure 6:
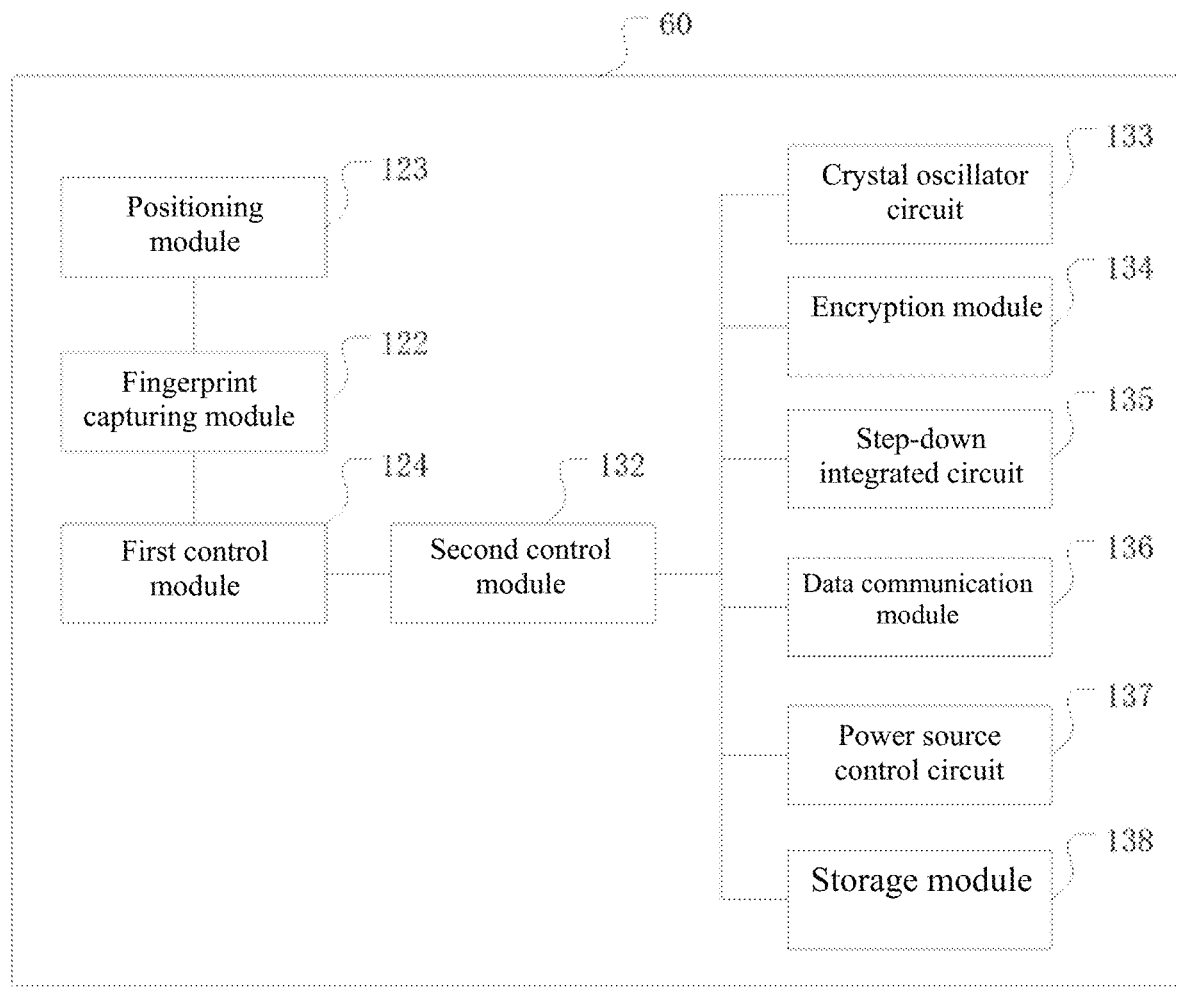
FIG. 6 is a schematic structural block diagram of another embodiment of a non-contact 3D fingerprint capturing apparatus according to an embodiment of the present invention.

Optionally, referring to FIG. 6, the circuit board further includes an encryption module 134, a crystal oscillator circuit 133, a step-down integrated circuit 135, a data communication module 136, and a light source control circuit 137. The encryption module 134, the crystal oscillator circuit 133, the light source control circuit 137, the step-down integrated circuit 135 and the data communication module 136 are all connected to the second control module 132.

The crystal oscillator circuit 133 is configured to provide a clock signal to the second control module 132. The encryption module 134 is configured to encrypt important data of the user, thus providing desirable protection for data of the user.

The housing of the apparatus includes a USB interface. The USB interface can provide an external power source for the apparatus. The step-down integrated circuit 135 is configured to provide a stable power source for the apparatus after reducing a voltage of the external power source.

The data communication module 136 is configured to communicate with an external server to receive or send data. For example, a 3D fingerprint database of the user may be stored in an external host server. The first control module 124 can send the created 3D fingerprint image to the server. The server performs rapid matching and sends a matching result to the data communication module 136, thus significantly improving a data matching speed and also improving the identification accuracy.

Figure 7:
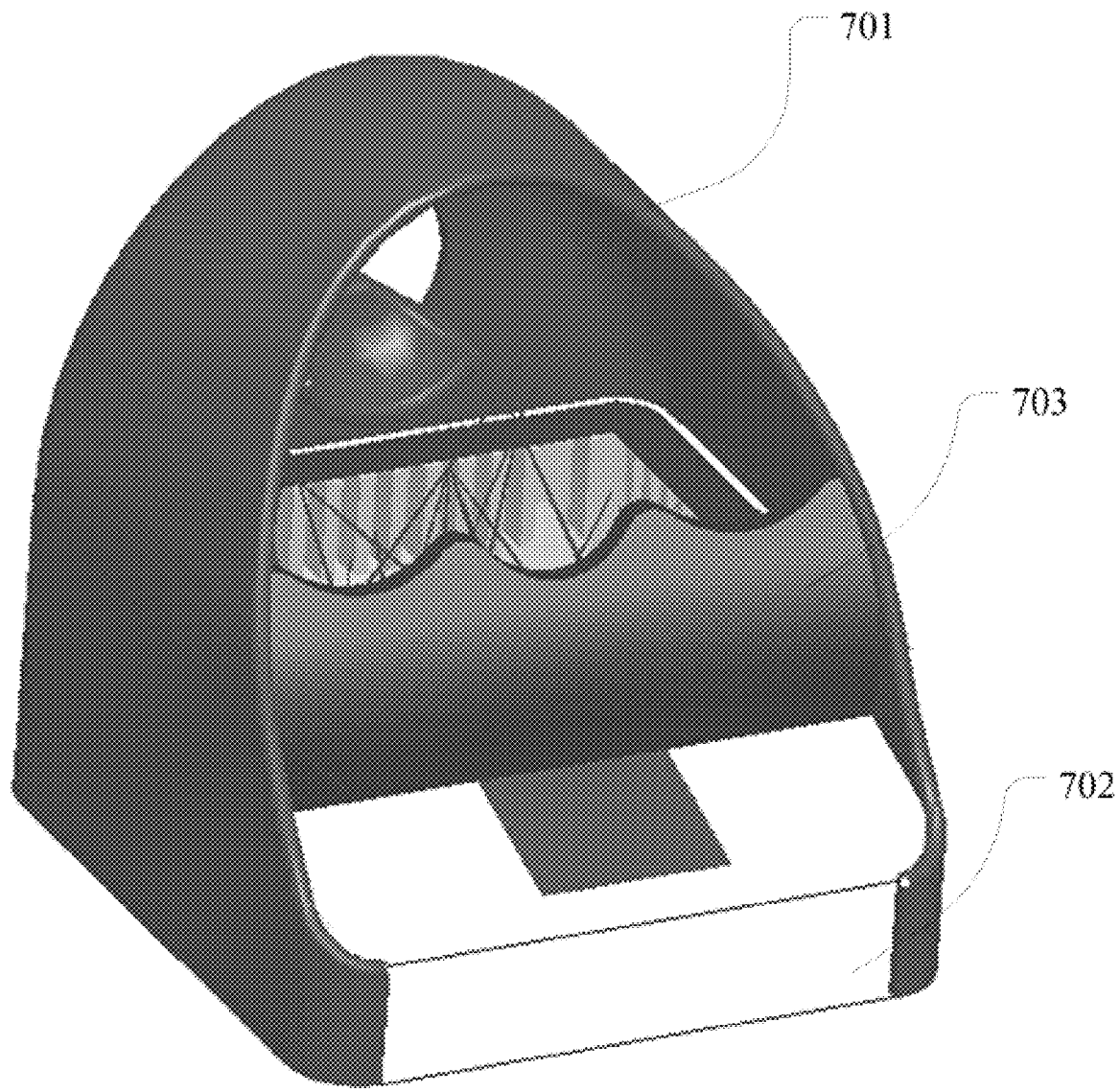
FIG. 7 is a schematic structural diagram of another embodiment of a non-contact 3D fingerprint capturing apparatus according to an embodiment of the present invention.

Optionally, referring to FIG. 7, the apparatus further includes a lens hood 701. The lens hood 701 is flexibly connected to the housing 702. For example, the lens hood 701 and the housing 702 can be connected through a snap joint. The lens hood is detachably connected to the housing. When the apparatus is in an environment with high light intensity, the lens hood can be added on the apparatus to shield intense light from the external environment, so that the apparatus is adaptable to the environment with high light intensity.

Optionally, a finger distance standard plate 703 is disposed in front of the lens hood 701. The finger distance standard plate 703 is disposed above the housing 702 and is flexibly connected to the housing 702. The finger distance standard plate 703 is in slight contact with the finger. The height of the finger distance standard plate 703 is the height of the standard point 800. When the user finger is in slight contact with the finger distance standard plate 703, the height of the position where the finger is placed is the same as the height of the standard point. The user can place the finger at the standard capturing position by moving the finger forward or backward, thus increasing the speed of placing the finger at the standard capturing position and reducing a fingerprint capturing time for the user.

Optionally, a filter layer can also be coated on an inner surface of the glass layer 11. The filter layer is used for filtering light out of a preset band range, while the laser emitted by the laser emission circuit and the light emitted by the first light source 131 and the second light source 1223 can pass through the filter layer, thus enhancing the capability of resisting external light interference of the apparatus.

It should be noted that the housing of the apparatus can also be provided with an inlay design to dispose the apparatus on another device. When another device needs an auxiliary function provided by the apparatus, the apparatus is used as a module of the device. The usability and flexibility of the apparatus are improved.

In the embodiment of the present invention, in order to achieve fingerprint accuracy in different directions, the position of a finger of a user is determined. After it is determined that the finger of the user is placed at a standard capturing position, fingerprint images of the finger are captured at different angles from at least multiple directions. A 3D image is created according to the captured fingerprint images, thus significantly improving the accuracy of the created 3D image, improving the simulation degree of the created 3D image, reducing the possibility of fingerprint counterfeiting, achieving a good anti-counterfeiting effect, and improving the security of identification.

The non-contact 3D fingerprint capturing apparatus is described above. An embodiment of the present invention further provides a non-contact 3D fingerprint capturing method. The method is applied to the apparatus provided in the foregoing embodiment. The structure of the apparatus is not described in detail here again. An embodiment of the method includes:

A laser positioning module casts light to a first position point on a finger object.

A fingerprint capturing module receives light reflected from the first position point, converts an optical signal into an electrical signal, and sends the electrical signal to a first control module.

The first control module judges, according to the electrical signal, whether the first position point is a standard point, the standard point being an aperture with a diameter less than a first threshold and an illumination intensity greater than a second threshold.

If the first position point is a standard point, the fingerprint capturing module captures fingerprint images from multiple directions and transmits the fingerprint images to the first control module.

The first control module creates a 3D fingerprint image according to the fingerprint images.

The first control module transmits the 3D fingerprint image to a second control module.

The second control module performs matching processing according to the 3D fingerprint image and a fingerprint image stored by a storage module to obtain a processing result.

Those skilled in the art can clearly understand that, in order to make the description convenient and concise, for the method described above, reference can be made to the corresponding process in the foregoing apparatus embodiment. Details are not described here again.

In the several embodiments provided in the present application, it should be understood that the disclosed apparatus and method may be implemented in other manners. For example, the apparatus embodiment described above is merely schematic. For example, the unit division is merely logical function division, and there may be other division manners in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electronic form, a mechanical form, or other forms.

Units described as separate parts may or may not be physically separate, parts displayed as units may or may not be physical units, and they may be located at the same place, or distributed on multiple network units. The objective of the solution of the embodiment may be implemented by selecting some or all of the units according to actual requirements.

In addition, functional units in the embodiments of the present invention may be integrated in a processing unit, or the units may also exist physically separately, or two or more units may be integrated in one unit. The integrated unit may be implemented in the form of hardware or in the form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part making contributions to the prior art, or some or all of the technical solutions may be implemented in the form of a software product. The computer software product may be stored in a storage medium and include several instructions for instructing a computer device (which may be a personal computer, a server, a network device, or the like) to execute all or some steps of the methods of embodiments of the present invention. The foregoing storage medium includes any medium that can store program codes, such as a USB flash drive, a mobile hard disk drive, a Read-Only Memory (ROM), a Random Access Memory (RAM), a magnetic disk, or an optical disc.

The embodiments described above are merely used for illustrating rather than limiting the technical solutions of the present invention. Although the present invention is described in detail with reference to the foregoing embodiments, those skilled in the art should understand that modifications may also be made to the technical solutions recorded in the foregoing embodiments, or equivalent replacements may also be made to some of the technical features. These modifications or replacements do not cause the essence of the corresponding technical solution to depart from the spirit and scope of the technical solutions of the embodiments of the present invention.

The invention claimed is:

1. A non-contact 3D fingerprint capturing apparatus comprising:
   a housing; and
   a fingerprint reader disposed in the housing, wherein the fingerprint reader comprises a fingerprint capturing module, a positioning module, and a first control module, the first control module being disposed on a circuit board, and wherein the positioning module is configured to cast light to a first position point on a finger object, wherein
   the fingerprint capturing module is configured to
       receive light reflected from the first position point,
       convert an optical signal into an electrical signal, and
       transmit the electrical signal to the first control module,
   the first control module is configured to determine according to the electrical signal, whether the first position point is a standard point, the standard point being an aperture with a diameter less than a first threshold and an illumination intensity greater than a second threshold, wherein
       in response to the first position being successfully determined as the standard point, the fingerprint capturing module is further configured to capture fingerprint images from multiple directions, and transmit the fingerprint images to the first control module, and wherein
   the first control module creates a 3D fingerprint image according to the fingerprint images, and wherein the control module in response to the first position point being unsuccessfully determined as the standard point, provides a voice prompt to a user to adjust a finger position.

2. The apparatus according to claim 1, wherein the circuit board comprises a second control module and a storage module, and wherein
   the first control module transmits the 3D fingerprint image to the second control module, and
   the second control module performs matching processing according to the 3D fingerprint image and a fingerprint image stored by the storage module to obtain a processing result.

3. The apparatus according to claim 1, wherein
   a first light source is disposed on the circuit board;
   the fingerprint capturing module comprises a reflector imaging assembly and an image capturing assembly, wherein the reflector imaging assembly comprises multiple planar reflectors in different directions, the image capturing assembly comprises a plurality of lenses, and a sensor is disposed on an image receiving surface in each of the plurality of lenses; and
   light emitted by the first light source is cast onto the finger object, light reflected from the finger object enters lens and is cast onto the corresponding sensor, wherein the sensor converts the optical signal into an electrical signal, and a preset angle is formed between the sensor and the lens.

4. The apparatus according to claim 1, wherein the fingerprint capturing module further comprises a second light source including at least two LED lamps, the LED lamp is disposed between every two lenses, and the second light source serves as a supplementary light source for the lenses.

5. The apparatus according to claim 1, wherein the positioning module comprises an emission circuit and a reflector, and wherein
   light emitted by the emission circuit is cast onto the reflector, and the reflector casts the light to the first position point on the finger object.

6. The apparatus according to claim 2, wherein the circuit board further comprises an encryption module, a crystal oscillator circuit, and a data communication module, each of which are connected to the second control module, and wherein
   the crystal oscillator circuit is configured to provide a clock signal for the second control module,
   the encryption module is configured to encrypt data, and
   the data communication module is configured to receive or send data transmitted by an external device.

7. The apparatus according to claim 1, wherein the housing is provided with a universal serial bus (USB) interface, and the circuit board comprises a step-down integrated circuit, wherein
   the USB interface is configured to be connected to an external power source, and
   the step-down integrated circuit is configured to supply power to the apparatus after reducing a voltage of the external power source.

8. The apparatus according to claim 1, further comprising a glass layer disposed above the fingerprint reader and configured to package the fingerprint reader in the housing, a filter layer is coated on an inner surface of the glass layer, and the filter layer is used for filtering light of a preset band.

9. A method implemented on at least one machine, each of which has at least one processor, storage, and a communication platform connected to a network for capturing a non-contact 3D fingerprint, the method comprising:
- emitting light to a first position point on a finger object;
- determining whether the first position point is a standard point, the standard point being an aperture with a diameter less than a first threshold and an illumination intensity greater than a second threshold;
- in response to the first position point is a being successfully determined as the standard point, capturing fingerprint images from multiple directions;
- creating a 3D fingerprint image according to the fingerprint images from the multiple directions;
- performing matching processing according to the 3D fingerprint image and a stored fingerprint image to obtain a processing result; and
- in response to the first position point being unsuccessfully determined as the standard point, providing a voice prompt to a user to adjust a finger position.

* * * * *